United States Patent
McTeggart et al.

(10) Patent No.: US 12,388,871 B1
(45) Date of Patent: Aug. 12, 2025

(54) SECURITY POSTURE RECOMMENDER SYSTEM

(71) Applicant: Rapid7, Inc., Boston, MA (US)

(72) Inventors: Ralph McTeggart, Belfast (GB); Martin Hutchings, Belfast (GB); Matthew McCarrison, Belfast (GB)

(73) Assignee: Rapid7, Inc., Boston, MA (US)

( * ) Notice: Subject to any disclaimer, the term of this patent is extended or adjusted under 35 U.S.C. 154(b) by 555 days.

(21) Appl. No.: 17/742,465

(22) Filed: May 12, 2022

(51) Int. Cl.
 *H04L 9/40* (2022.01)
 *G06F 21/12* (2013.01)
 *G06F 21/31* (2013.01)

(52) U.S. Cl.
 CPC .......... *H04L 63/20* (2013.01); *G06F 21/121* (2013.01); *G06F 21/31* (2013.01); *H04L 63/104* (2013.01)

(58) Field of Classification Search
 CPC ..... H04L 63/20; H04L 63/104; G06F 21/121; G06F 21/31
 See application file for complete search history.

(56) References Cited

U.S. PATENT DOCUMENTS

| | | | |
|---|---|---|---|
| 11,546,301 B2 * | 1/2023 | Mutnuru | H04L 63/0263 |
| 11,562,312 B1 * | 1/2023 | Fleming | G06F 8/60 |
| 11,704,589 B1 * | 7/2023 | Sohoney | G06F 21/566 |
| | | | 706/12 |
| 11,895,126 B1 * | 2/2024 | Satish | H04L 63/1425 |
| 12,126,695 B1 * | 10/2024 | Erlingsson | G06F 21/57 |
| 2017/0207980 A1 * | 7/2017 | Hudis | H04L 41/0803 |
| 2020/0387584 A1 * | 12/2020 | Gaber | G06F 18/232 |
| 2021/0034581 A1 * | 2/2021 | Boven | G06F 16/212 |
| 2022/0046059 A1 * | 2/2022 | Pandurangi | H04L 63/20 |
| 2023/0196451 A1 * | 6/2023 | Rao | G06Q 20/407 |
| | | | 705/35 |

OTHER PUBLICATIONS

M. F. Franco, B. Rodrigues and B. Stiller, "Mentor: The Design and Evaluation of a Protection Services Recommender System," 2019 15th International Conference on Network and Service Management (CNSM), Halifax, NS, Canada, 2019, pp. 1-7, doi: 10.23919/CNSM46954.2019.9012686 (Year: 2019).*

F. Soldo, A. Le and A. Markopoulou, "Predictive Blacklisting as an Implicit Recommendation System," 2010 Proceedings IEEE Infocom, San Diego, CA, USA, 2010, pp. 1-9, doi: 10.1109/INFCOM.2010.5461982 (Year: 2010).*

* cited by examiner

Primary Examiner — Fatoumata Traore
(74) Attorney, Agent, or Firm — Ashwin Anand

(57) ABSTRACT

Various embodiments include systems and methods to implement a security posture recommender system. The security posture recommender system may improve the security posture of a deployment of assets by generating recommendation data indicating how to modify the deployment of assets. A deployment may be described by deployment data. The recommendation data may be based on similarities and/or differences between deployment data for a particular user and deployment data associated with users that are within a cluster of users similar to the particular user.

20 Claims, 7 Drawing Sheets

500

Determine a plurality of deployment data indicative of a plurality of deployments associated with a plurality of users, where a given deployment among the plurality of deployments is indicative of a given one or more assets and a given one or more security components.
510

Determine, based on the plurality of deployment data, one or more clusters of deployment data.
520

Determine, based on individual deployment data associated with an individual user among the plurality of users, that the individual user is associated with a cluster of deployment data among the one or more clusters of deployment data.
530

Determine, based on one or more differences between the individual deployment data and the cluster deployment data, recommendation data indicative of a modification to a deployment of assets and security components associated with the individual user, where the modification improves a security posture of the deployment of assets and security components.
540

┌─────────────────────────────────────────────────────────────┐
    │ Determine usage data indicative of usage of one or more      │
    │ security components among the plurality of deployments,      │
    │ where the usage of the one or more security components       │
    │ is associated with the plurality of users.                   │
    │                            610                               │
    └─────────────────────────────────────────────────────────────┘
                                  │
                                  ▼
    ┌─────────────────────────────────────────────────────────────┐
    │ Determine a plurality of deployment data indicative of a     │
    │ plurality of deployments associated with a plurality of      │
    │ users, where a given deployment among the plurality of       │
    │ deployments is indicative of a given one or more assets      │
    │ and a given one or more security components.                 │
    │                            510                               │
    │  ┌───────────────────────────────────────────────────────┐  │
    │  │ Determine that the plurality of deployment data is    │  │
    │  │ indicative of the usage data.                         │  │
    │  │                        620                            │  │
    │  └───────────────────────────────────────────────────────┘  │
    └─────────────────────────────────────────────────────────────┘
                                  │
                                  ▼
    ┌─────────────────────────────────────────────────────────────┐
    │ Determine, based on the plurality of deployment data, one    │
    │ or more clusters of deployment data.                         │
    │                            520                               │
    └─────────────────────────────────────────────────────────────┘
                                  │
                                  ▼
    ┌─────────────────────────────────────────────────────────────┐
    │ Determine, based on individual deployment data associated    │
    │ with an individual user among the plurality of users, that   │
    │ the individual user is associated with a cluster of          │
    │ deployment data among the one or more clusters of            │
    │ deployment data.                                             │
    │                            530                               │
    └─────────────────────────────────────────────────────────────┘
                                  │
                                  ▼
    ┌─────────────────────────────────────────────────────────────┐
    │ Determine, based on one or more differences between the      │
    │ individual deployment data and the cluster deployment        │
    │ data, recommendation data indicative of a modification to    │
    │ a deployment of assets and security components associated    │
    │ with the individual user, where the modification improves    │
    │ a security posture of the deployment of assets and           │
    │ security components.                                         │
    │                            540                               │
    └─────────────────────────────────────────────────────────────┘
```

*FIG. 6*

SECURITY POSTURE RECOMMENDER SYSTEM

BACKGROUND

Many companies operate computer environments that are connected to public networks such as the internet. While such connections allow users to access resources on the public networks, they also expose a company network to potential cyberattacks. Cyberattacks may obtain sensitive information, gain control of the company's computing systems, or damage company resources. As a result, security management systems have become increasingly important to protect private company networks against these types of vulnerabilities.

BRIEF DESCRIPTION OF THE DRAWINGS

FIG. 5 is a flowchart that illustrates an example process of implementing a security posture recommender system, according to some embodiments.

FIG. 6 is a flowchart that illustrates an example process of implementing a security posture recommender system, according to some embodiments.

Figure 1:
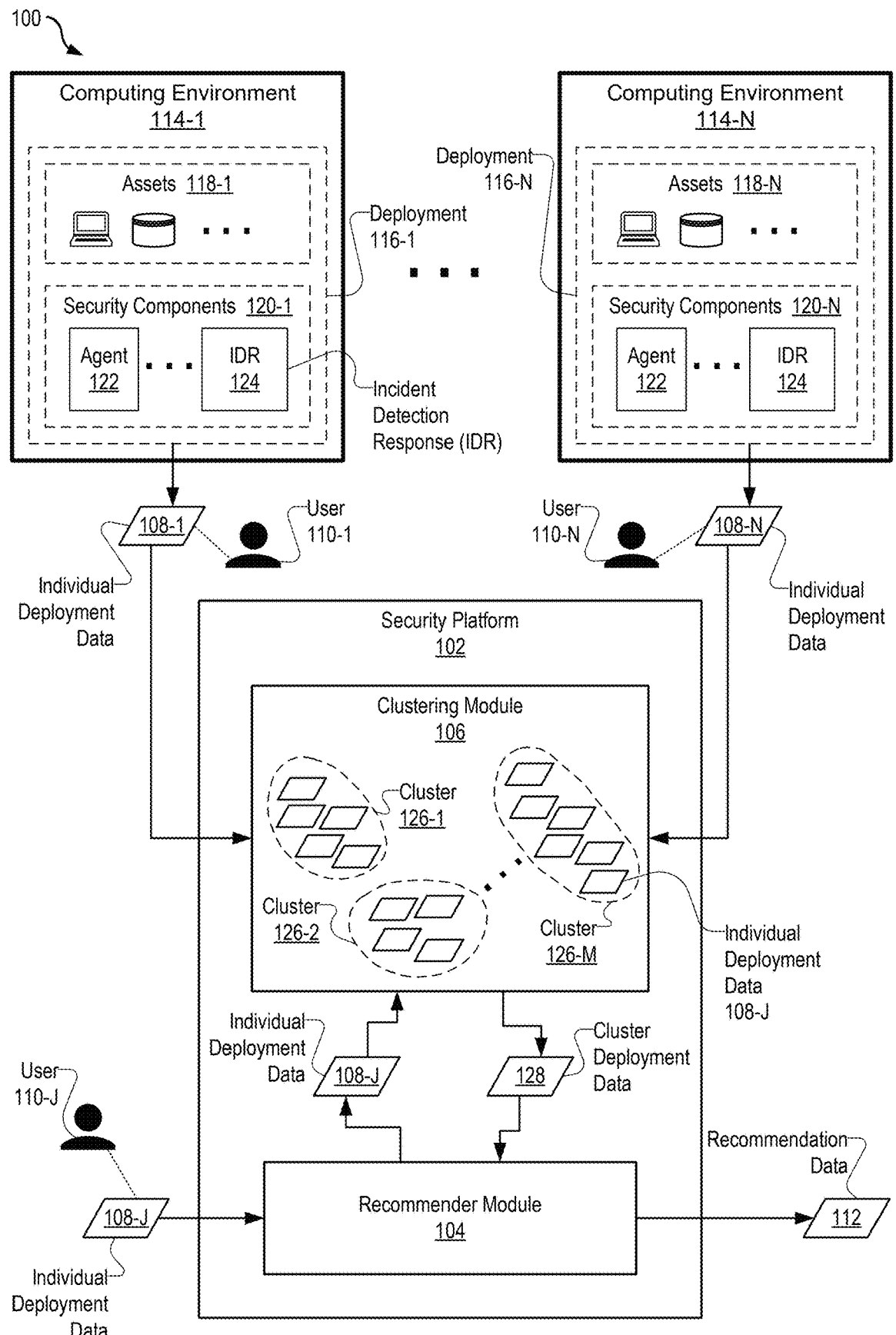
FIG. 1 is a block diagram illustrating an example system that implements a security posture recommender system, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may improve protection from cyberattacks to a deployment of assets within a computing environment. The security platform may increase protection by implementing a security posture recommender system for providing recommendations for how a user may strengthen a security posture. A user may deploy assets to provide services, such as database services, storage services, website hosting services, among other types of services. A security posture for the deployment of assets may describe an overall strength against cyberattacks, unauthorized software installations, vulnerabilities to unauthorized usage, or modifications to deployed assets.

As described herein, a security platform may improve the security posture of a deployment of assets, including security components, by generating recommendation data indicating how to modify the deployment of assets. The security platform may determine the recommendation data based on similarities and/or differences between deployment data for a particular user and deployment data associated with users that are within a cluster of users similar to the particular user.

Deployment data may describe assets, security components, usage of one or more security components, usage of one or more assets, asset configurations, licensing data for the one or more security components, network configurations, configurations of security component features, and so on.

In traditional approaches that use a recommender system to determine recommendations, recommendations may be based on one or more user selections, user history, or other types of affirmative choices or selections made by the user. Such a traditional approach may provide information that is predictive of a user preference. However, such traditional approaches fail to consider how a user deploys and uses security products or how to use data descriptive of a set of assets deployed within a computing environment.

Disclosed is a security platform that determines recommendation data indicating how to configure or use a security component, which security components to install within a deployment of assets, or which security components may no longer be beneficial to continue using. The security platform may determine recommendation data based on deployment data associated with users of one or more security components, clusters of users that use security components similarly, and similarities between deployment data associated with a user and deployment data associated with one or more clusters of deployment data associated with multiple other users.

Based on the security platform using deployment data associated with a user deployment to generate recommendation data indicating one or more modifications to a deployment of assets, the recommendation data may result in strengthening a security posture for a deployment. A strengthened security posture for a deployment may create a more resilient, safer, or more stable environment for providing services. Such a strengthened security posture may preserve a user's security reputation, save money from reduced downtimes, reduce legal liabilities, provide more reliable services, and improve the goodwill a user may have with customers.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, an example computing environment 100 illustrates various components of a security platform 102 that implements a security posture recommender system, in accordance with some embodiments.

In some implementations, the security platform 102 may improve the security posture of a deployment based on modifications to the deployment in accordance with recommendation data. In this example, the security platform 102 may receive a plurality of deployment data from a plurality of computing environments. The plurality of deployment data may be indicative of, at least, one or more security components and/or one or more assets within deployments associated with a plurality of users.

The security platform 102 may cluster the plurality of deployment data into one or more clusters of similar deployments. Given individual deployment data associated with an individual user among the plurality of users, the security platform 102 may determine which cluster comprises the individual deployment data. Based on a comparison between the individual deployment data and cluster deployment data, the security platform 102 may determine recommendation data.

The cluster deployment data may be representative of deployment data for one or more instances of deployment data within a given cluster. A deployment may be a deployment of assets and/or security components, including licensing data, configuration data, and other types of data descriptive of a configuration, operation, and features of assets and/or security components. In this example, an individual deployment may be associated with a user.

In this example, the security platform 102 may comprise a recommender module 104 and a clustering module 106. The recommender module 104 may, based on individual deployment data 108-J associated with an individual user 110-J, determine recommendation data 112.

In this example, the security platform 102 may provide security services to multiple users, depicted as users 108-1-108-N. A given user 108 may have an associated deployment 116. In this example, a user 108-1 is associated with deployment 116-1, and so on, where user 108-N is associated with deployment 116-N. In the interest of simplicity, in this example, a single user is associated with a single deployment; however, generally, a user may be associated with one or more deployments and a computing environment 110 may be associated with one or more deployments.

The security platform 102 may receive a plurality of deployment data 108-1-108-N from a plurality of computing environments 114-1-114-N. The plurality of deployment data 108-1-108-N may comprise the individual deployment data 108-J associated with the individual user 112-J. Example computing resources comprising an implementation of the security platform 102 are described in greater detail with respect to both FIGS. 2 and 7.

The computing environments 114-1-114-N may comprise one or more deployments among the plurality of deployments 116-1-116-N. In this example, a given computing environment 114 may comprise one or more assets, including one or more compute instances, such as hardware processors, virtual machines, clusters, network devices, communications networks, among others. A given compute environment may be associated with memory (not shown, See, e.g., FIG. 7) used by one or more assets and/or one or more security components.

Deployment data 108 may be indicative of one or more assets 118 within a computing environment 114. Deployment data 108 may be indicative of one or more security components. As described herein, deployment data 108 may describe use of one or more of: security components, assets 118-1-118-N, asset configurations, licensing data for the one or more security components, licensing data for one or more assets, network configurations, usage patterns of security components, asset usage patterns, configurations of security component features, and so on.

Deployment data 108 may be represented as a vector of values. For example, an individual value within the vector of values may be a dimension of a deployment associated with an instance of deployment data 108. Deployment data 108, including determination of a vector of values associated with a deployment is described in greater detail with respect to FIG. 3.

A dimension may be representative of a modifiable aspect of a deployment. For example, a dimension may be representative of one of: presence of a security component, presence of an asset, an asset configuration, licensing data for a security component, licensing data for an asset, a network configuration, a usage pattern of a security component, a usage pattern of an asset, a configuration of a single security component feature, a configuration of a single asset feature, and so on.

A security component 120 may be an application, a module, a monitor, an agent 122, an incident detection response 124 (IDR) security product, or some type of executing software or process that provides one or more security features to a deployment. A security component 120 may be a product associated with licensing data. Licensing data may be indicative of a type of license, a scope of a license, usage restrictions, distribution requirements, among other types of data.

An agent 122 may be an application that operates within a computing environment 114 to determine deployment data. In some examples, a given agent 122 may determine one or more topologies associated with one or more assets 118 of a given computing environment 114. In some examples, a given agent 122 may determine presence of one or more assets 118 within a given computing environment 114. In some examples, a given agent 122 may determine configuration data associated with one or more assets 118 of a given computing environment 114.

In some implementations, an agent 122 may determine deployment data 108 for a given computing environment 114 and provide the deployment data 108 to the security platform 102. In some examples, the agent 122 may send updated deployment data 108 periodically. In some examples, the agent 122 may send deployment data 108 in response to one or more of: a change in asset installation, asset uninstallation, asset configuration change, security component installation, security component uninstallation, a security component configuration change, a change in licensing data, a change in a network configuration, updates to an asset, updates to a security component, an installation of a network device, an uninstallation of a network device, a change in usage patterns of security components, a change in usage patterns of one or more assets, among other changes to a computing environment 114.

An example security component, an incident detection response component, depicted as DR 124, may provide security features, including one or more of: endpoint detection and response, network traffic analysis, user and entity behavior analytics, security information and event management, embedded threat intelligence, deception technology, or MITRE and ATT&CK alignment.

The security platform 102 may use the clustering module 106 to determine one or more clusters 126-1-126-M. The clustering module 106 may implement one or more clustering algorithms. In some embodiments, the clustering module 106 may comprise a machine learning model that given a plurality of deployment data, determines one or more clusters of deployment data. In this example, the clustering module 106 may use a machine learning model to determine clusters 126-1-126-M of deployment data given input of individual deployment data 108-1-108-N. In this example, based on the clustering by the machine learning model, each instance of deployment data may be similar to each other instance of deployment data within a same cluster 126.

In some implementations, a machine learning model may be trained using datasets that include training data indicating similar deployment data instances. In this example, similarity within training data indicating similar deployment instances may be based on first deployment data being greater than a threshold level of similarity to second deployment data. A threshold level of similarity may be based on one or more values of the first deployment data being within a threshold difference value to one or more values of the second deployment data.

In this example, based on clusters 126-1-126-M, the clustering module 106 may, given individual deployment data, determine a cluster 126 associated with the given deployment data, and provide cluster deployment data. The plurality of deployment data 108 may comprise the given individual deployment data, such as individual deployment data 108-J. In this example, the cluster 126-M comprises the individual deployment data 108-J.

Cluster deployment data, such as cluster deployment data 128, may be representative of deployment data for one or more instances of deployment data 108 included within a given cluster 126. Cluster deployment data 128, for an individual dimension, may be based on a value or setting that is in a majority, a plurality, or an average of instances of deployment data within a given cluster. An individual dimension may be a single value within a vector of values, where the individual dimension may be representative of one of a modifiable aspect of a deployment.

Continuing this example, the security platform 102, given an indication of an instance of deployment data, may use the recommender module 104 to determine the recommendation data 112. For example, the instance of deployment data may be individual deployment data 108-J, where individual deployment data 108-J may be associated with a user 110-J.

The security platform 102 may use the individual deployment data 108-J to identify cluster deployment data 128 as a cluster that comprises the individual deployment data 108-J. As described above, in this example, the cluster 126-M may comprise the individual deployment data 108-J. Based on the cluster deployment data 128 and on the individual deployment data 108-J, the recommender module 104 may determine the recommendation data 112.

In some implementations, the recommender module 104 may use collaborative filtering to determine the recommendation data 112. Collaborative filtering may use first data associated with a cluster of data to determine an individual recommendation for changing second data, where the second data is similar to the first data. In some examples, the recommendation may result in modifying the second data to be more similar, or equal to, the first data.

In some examples, such as the example described above, deployment data may be representative of multiple dimensions, such as the dimensions for deployment data 116. In some examples, collaborative filtering is based on the security posture associated with a group of deployments being stronger than a random, individual deployment. In some examples, collaborative filtering may be memory-based, model-based, or deep-learning based.

The recommendation data 112 may be indicative of one or more of: a security component to include within the deployment; a feature of a security component to enable, disable, or modify; a software component to license; a modification to usage of a security component, security component feature, a change to a usage pattern associated with an asset; a change to a usage pattern associated with a security component; a modification to a topology associated with one or more assets; a change to licensing data; or a modification to a topology associated with one or more security components. A topology may describe how assets and/or security components are arranged and/or connected to one another.

Based on the security platform 102 using the individual deployment data 108-J associated with a deployment 116-J to generate recommendation data 112 indicating one or more modifications to a deployment, the recommendation data 112 may result in strengthening a security posture for a deployment. A strengthened security posture for a deployment may create a more resilient, safer, or more stable environment for providing services. Such a strengthened security posture may preserve a user's security reputation, save money from reduced downtimes, reduce legal liabilities, provide more reliable services, and improve the goodwill a user may have with customers.

Figure 2:
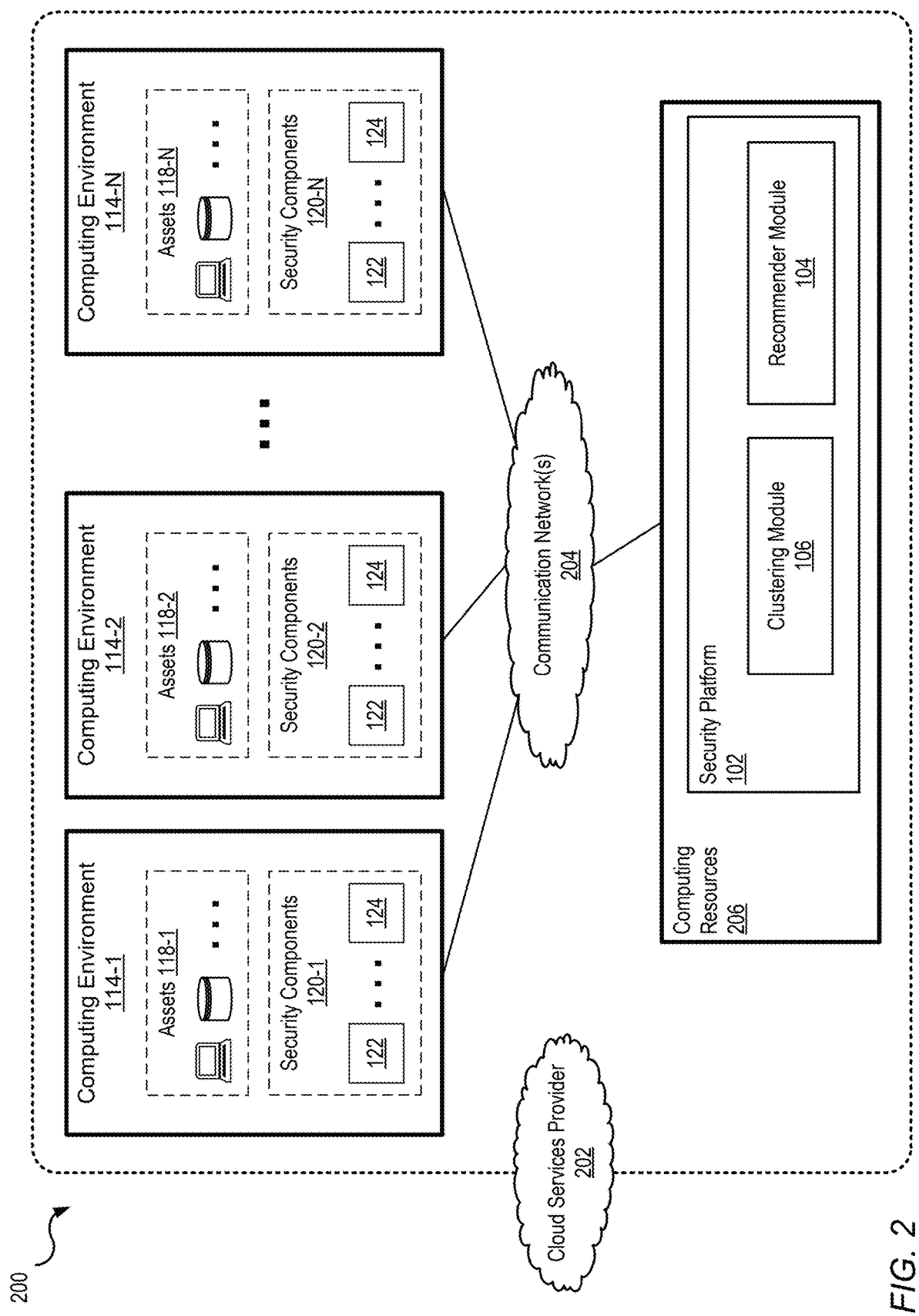
FIG. 2 is a block diagram illustrating an example computing environment that implements a security posture recommender system, in accordance with some embodiments.

Referring to FIG. 2, an example computing environment 200 illustrates various computing resources associated with a security platform 102 that implements a security posture recommender system, in accordance with some embodiments.

In some implementations, the security platform 102 may be implemented within a cloud environment provided by a cloud services provider 202. The cloud services provider 302 depicted in FIG. 2 may be implemented, for example, as a system and computing environment that provides services to users of the cloud services provider 302 through the sharing of computing resources. The cloud services provider 302 may provide on-demand access to a shared pool of configurable computing resources such as computer networks, servers, storage, applications, services, and so on. The shared pool of configurable resources may be rapidly provisioned and released to a user of the cloud services provider 302 with minimal management effort. Example cloud services providers include Amazon™ AWS, Microsoft Azure™, Google Cloud Platform™, among others.

In the example depicted in FIG. 2, the cloud services provider 302 may be configured to provide services to implement computing environments 114-1-114-N, one or more communication networks 204, and computing resources 206. In some examples, the cloud services provider 302 may be configured to provide services through the implementation of various models, including infrastructure as a service ('IaaS') service, platform as a service ('PaaS') service, software as a service ('SaaS') service, among other models.

In some implementations, the computing environments 114 and/or the computing resources 206 may be implemented as a container system. For example, a container system may be implemented by one or more container orchestration systems, including Kubernetes™, Docker Swarm™, among others. The container orchestration system may run on a cluster of nodes. In some examples, a given node may be implemented by one or more compute instances provided by the cloud services provider 302. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of the cluster. In this example, the security platform 102 may be implemented by a one or more containerized applications, where the one or more containerized applications may comprise the recommender module 104 and the clustering module 106.

Figure 3:
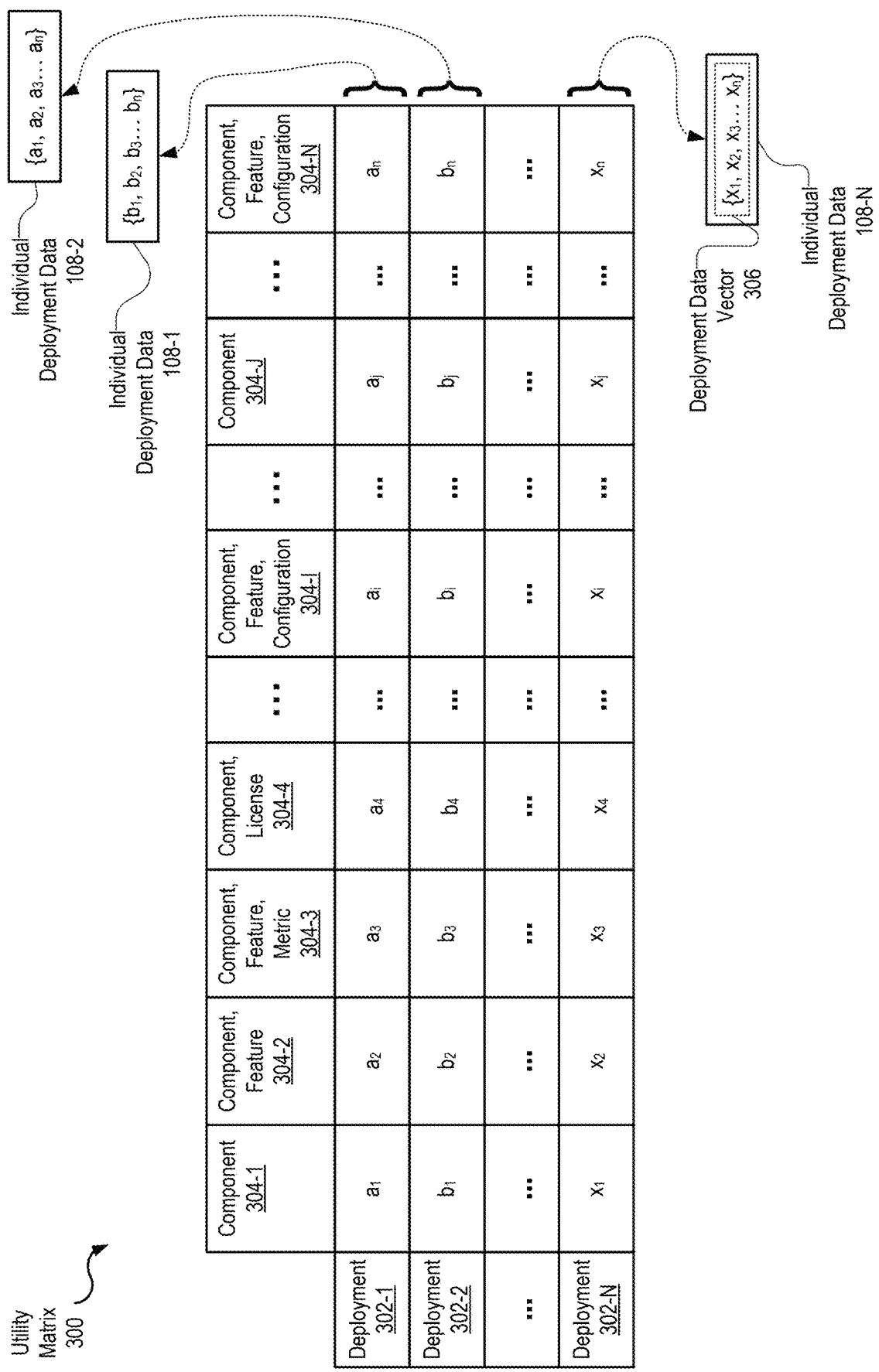
FIG. 3 is a block diagram illustrating a utility matrix used by a security posture recommender system, in accordance with some embodiments.

Referring to FIG. 3, depicted is an example utility matrix 300 that illustrates various dimensions of deployment data, in accordance with some embodiments.

The utility matrix 300 may represent dimensions of a plurality of deployment data associated with a plurality of deployments. The plurality of deployments may be associated with a plurality of users, such as the plurality of deployments 116-1-116-N and the plurality of users 110-1-110-N described with respect to FIG. 1. A dimension may be In some implementations, a given row 302 of the utility matrix 300 may be associated with a given deployment, and a given column 304 of the utility matrix 300 may be associated with a dimension of a given deployment. For example, as described above, a dimension may be a value that is representative of: a security component, an asset, an asset configuration, licensing data for a security component, a network configuration, a usage pattern of a security component, an asset usage pattern, a configuration of a single security component feature, and so on.

In this example, there may be at least one deployment associated with a plurality of users, such as the plurality of users 110-1-110-N and the associated plurality of deployments 116-1-116-N described with respect to FIG. 1. Continuing this example, a given row among the rows 302-1-302-N of the utility matrix 300 may be associated with a given deployment 116 among the plurality of deployments 116-1-116-N.

In this example, for a given deployment 302, associated deployment data 108 may comprise a plurality of values associated with a plurality of dimensions 304. The plurality of values for given deployment data may be represented as a deployment data vector, such as deployment data vector 306.

Continuing this example, the plurality of dimensions 304 comprises a first security component 304-1, a first security component feature 304-2, a first security component feature metric 304-3, a first security component license value 304-4, and so on, until a last dimension value for the first security component, a first security component feature configuration value 304-I. The plurality of dimensions 304 may further comprise a second security component 304-J, and so on, until a last dimension value of a last security component, security component feature configuration value 304-N. While not depicted for the sake of clarity, individual deployment data 108 may comprise a dimension value for any of the example dimensions described above. In this example, a metric dimension value may be representative of usage data, or a usage pattern. For example, usage data may be how much time per a given period of time a feature or aspect associated with a dimension is used. Similarly, a usage pattern may be a frequency of use of a feature or aspect associated with a dimension. Usage data may be determined by an agent or monitor operating within a deployment.

With respect to a given deployment 302, associated individual deployment data 108 comprises dimension values corresponding to each dimension 304. For example, with respect to deployment 302-1, individual deployment data 108-1 comprises dimension values represented by dimensions 304-1-304-N, which include $a_1$-$a_N$. A deployment data vector associated with individual deployment data 108-1 may be represented by $\{a_1, a_2, \ldots, a_N\}$.

Similarly, with respect to deployment 302-2, individual deployment data 108-2 comprises dimension values represented by dimensions 304-1-304-N, which include $b_1$-$b_N$. A deployment data vector associated with individual deployment data 108-2 may be represented by $\{b_1, b_2, \ldots, b_N\}$. Similarly, for each dimension 302-3-302-(N-1) (not depicted), until with respect to deployment 302-N, individual deployment data 108-N comprises dimension values represented by dimensions 304-1-304-N, which include $x_1$-$x_N$. A deployment data vector 306 associated with individual deployment data 108-N may be represented by $\{x_1, x_2, \ldots, x_N\}$.

Figure 4:
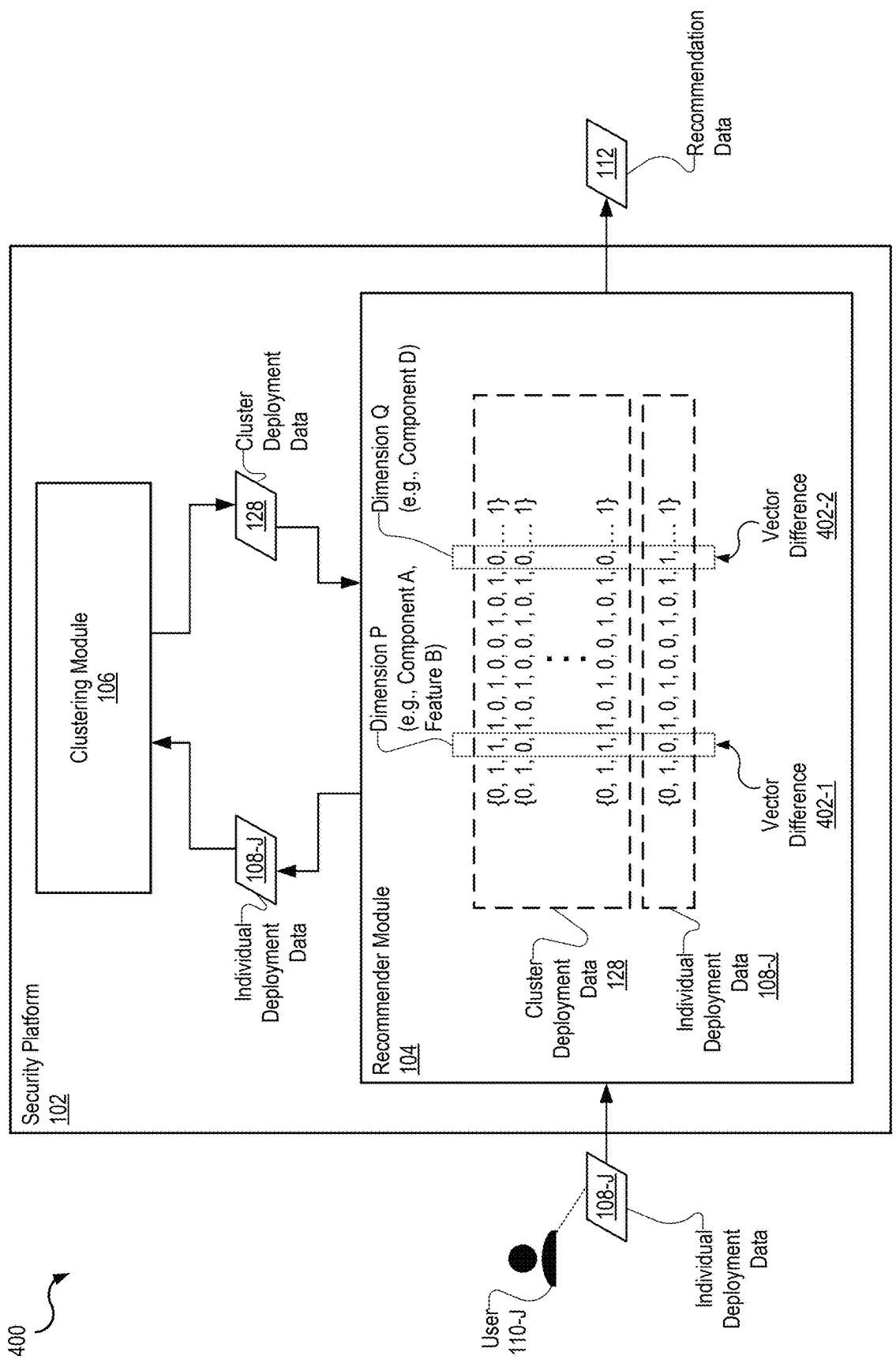
FIG. 4 is a block diagram illustrating components of a security posture recommender system, in accordance with some embodiments.

Referring to FIG. 4, depicted is a block diagram of the security platform, in accordance with some embodiments.

In some implementations, the security platform 102 may improve the security posture of a deployment based on modifications to the deployment in accordance with recommendation data. In this example, the security platform 102 may receive a plurality of deployment data 108-1-108-N from a plurality of computing environments 116-1-116-N. The security platform 102 may cluster the plurality of deployment data 108 into one or more clusters 126 of similar deployments.

In this example, given individual deployment data 108-J associated with an individual user 110-J, the security platform 102 may determine which cluster comprises the individual deployment data 108-J. As described with respect to FIG. 1, cluster 126-M comprises individual deployment data 108-J.

Continuing this example, based on cluster 126-M comprising individual deployment data 108-J, the clustering module 106 may provide cluster deployment data 128 to the recommender module 104. The cluster deployment data 128 may be representative of deployment data for one or more instances of deployment data within the cluster 126-M.

Based on a comparison between the individual deployment data 108-J and cluster deployment data 128, the security platform 102 may determine the recommendation data 112. To determine the recommendation data 112, the recommender module 104 may use collaborative filtering. Collaborative filtering may use the cluster deployment data associated with a cluster of deployment data to determine an individual recommendation for changing the individual deployment data 108-J. In some implementations, the recommender module 104 may use user-user collaborative filtering, which may rely on neighboring data to make a recommendation, where neighboring data may be present within a same cluster of data.

In this example, based on individual deployment data 108-J being in a same cluster 126-M as the cluster deployment data, a vector associated with the individual deployment data 108-J may be similar to one or more vectors associated with the one or more deployment data instances of the cluster 126-M. Continuing this example, for the sake of simplicity, there are two vector differences between the vector associated with the individual deployment data 108-J and one or more vectors associated with the one or more deployment data instances of the cluster deployment data 128. The first vector difference is 402-1 and is associated with a dimension indicted by dimension P (e.g., "Component A, Feature B"). The second vector difference is 402-2 and is associated with a dimension indicated by dimension P (e.g., "Component D").

In different implementations, there may be different implementations of a collaborative filtering algorithm. In this example, the security platform 102 may determine recommendation data 112 that indicates, for dimension P of the individual deployment data 108-J, a recommendation that is based on one or more of the dimension values for dimension P in the one or more instances of dimension data included within the cluster deployment data 128.

Similarly, the security platform 102 may determine recommendation data 112 that indicates, for dimension Q of the individual deployment data 108-J, a recommendation that is based on one or more of the dimension values for dimension Q in the one or more instances of dimension data included within the cluster deployment data 128. In this example, recommendation data 112 may indicate an installation of security component A, including feature B, and indicate an uninstall of security component D.

In this example, dimension values included within the recommendation data 112 may be determined for one or more dimensions for which there is a difference in vector values. A difference in vector values, for a given dimension, may be determined between the individual deployment data 108-J and one or more of the instances of deployment data included in the cluster deployment data 128.

Continuing this example, based on a collaborative filtering algorithm that implements a nearest neighbor algorithm, a dimension value for dimension P in a recommendation may be determined by a plurality vote based on dimension values of dimension P of the one or more instances of dimension data included in the cluster deployment data 128. For example, while not all dimension values are depicted, the nearest neighbor algorithm may determine a value of "1", which may be indicative of a recommendation to modify dimension P, or to install security component A, including feature B.

Similarly, a dimension value for dimension Q in a recommendation may be determined by a plurality vote based on dimension values of dimension Q of the one or more instances of dimension data included in the cluster deployment data 128. For example, while not all dimension values are depicted, the nearest neighbor algorithm may determine a value of "0", which may be indicative of a recommendation to modify dimension Q, or to uninstall security component D.

FIG. 5 is a flowchart 500 that illustrates an example of a process of a security posture recommender system, according to some embodiments. In FIG. 5, one or more hardware processors may be utilized to implement the example process.

The example process includes: determining, at 510, a plurality of deployment data indicative of a plurality of deployments associated with a plurality of users, where a given deployment among the plurality of deployments is indicative of a given one or more assets and a given one or more security components; determining, at 520, based on the plurality of deployment data, one or more clusters of deployment data; determining, at 530, based on individual deployment data associated with an individual user among the plurality of users, that the individual user is associated with a cluster of deployment data among the one or more clusters of deployment data; and determining, at 540, based on one or more differences between the individual deployment data and the cluster deployment data, recommendation data indicative of a modification to a deployment of assets and security components associated with the individual user, where the modification improves a security posture of the deployment of assets and security components.

Determining, at 510, the plurality of deployment data indicative of the plurality of deployments associated with a plurality of users may be carried out as described with respect to FIG. 1. For example, as described with respect to FIG. 1, an agent 122 may be an application that operates within a computing environment 114 to determine deployment data. In some examples, a given agent 122 may determine one or more topologies associated with one or more assets 118 of a given computing environment 114. In some examples, a given agent 122 may determine presence of one or more assets 118 within a given computing environment 114. In some examples, a given agent 122 may determine configuration data associated with one or more assets 118 of a given computing environment 114.

In some implementations, an agent 122 may determine deployment data 108 for a given computing environment 114 and provide the deployment data 108 to the security platform 102. In some examples, the agent 122 may send updated deployment data 108 periodically. In some examples, the agent 122 may send deployment data 108 in response to one or more of: a change in asset installation, asset uninstallation, asset configuration change, security component installation, security component uninstallation, a security component configuration change, a change in licensing data, a change in a network configuration, updates to an asset, updates to a security component, an installation of a network device, an uninstallation of a network device, a change in usage patterns of security components, a change in usage patterns of one or more assets, among other changes to a computing environment 114.

Determining, at 520, based on the plurality of deployment data, one or more clusters of deployment data may be carried out as described with respect to FIG. 1. For example, the security platform 102 may use the clustering module 106 to determine one or more clusters 126-1-126-M. The clustering module 106 may implement one or more clustering algorithms. In some embodiments, the clustering module 106 may comprise a machine learning model that given a plurality of deployment data, determines one or more clusters of deployment data. In this example, the clustering module 106 may use a machine learning model to determine clusters 126-1-126-M of deployment data given input of individual deployment data 108-1-108-N. In this example, based on the clustering by the machine learning model, each instance of deployment data may be similar to each other instance of deployment data within a same cluster 126.

Determining, at 530, based on individual deployment data associated with an individual user among the plurality of users, that the individual user is associated with the cluster of deployment data among the one or more clusters of deployment data may be carried out as described with respect to FIG. 1. For example, given individual deployment data 108-J associated with an individual user among the plurality of users, the security platform 102 may determine which cluster 126-1-126-M comprises the individual deployment data.

Determining, at 540, based on one or more differences between the individual deployment data and the cluster deployment data, recommendation data indicative of a modification to a deployment of assets and security components associated with the individual user may be carried out as described with respect to FIG. 1. For example, recommendation data may be based on a collaborative filtering algorithm that implements a nearest neighbor algorithm. Continuing this example, with respect to a cluster, a dimension value for a given dimension of a deployment in a recommendation may be determined by a plurality vote based on dimension values of the one or more instances of dimension data included in the cluster deployment data 128.

Thus, FIG. 5 illustrates an example of a process of using a security posture recommender system to improve a security posture of a deployment of assets and security components.

FIG. 6 is a flowchart 600 that illustrates an example of a process of a security posture recommender system, according to some embodiments. In FIG. 6, one or more hardware processors may be utilized to implement the example process.

The example process depicted in FIG. 6 includes the process operations described with respect to FIG. 5. However, the example process depicted in FIG. 6 further includes: determining, at 610, usage data indicative of usage of one or more security components among the plurality of deployments, where the usage of the one or more security components is associated with the plurality of users; and determining, at 620, that the plurality of deployment data is indicative of the usage data.

Determining, at 610, usage data indicative of usage of one or more security components among the plurality of deployments may be carried out as described with respect to FIG. 1. For example, usage data may be how much time per a given period of time a feature or aspect associated with a dimension is used. Similarly, a usage pattern may be a frequency of use of a feature or aspect associated with a dimension. Usage data may be determined by an agent or monitor operating within a deployment.

Determining, at 620, that the plurality of deployment data is indicative of the usage data may be carried out as described with respect to FIG. 1. For example, the deployment data for a given deployment may be updated to indicate dimension values associated with the usage data for a given security component and/or asset.

Thus, FIG. 6 illustrates an example of a process of using a security posture recommender system to improve a security posture of a deployment of assets and security components.

Figure 7:
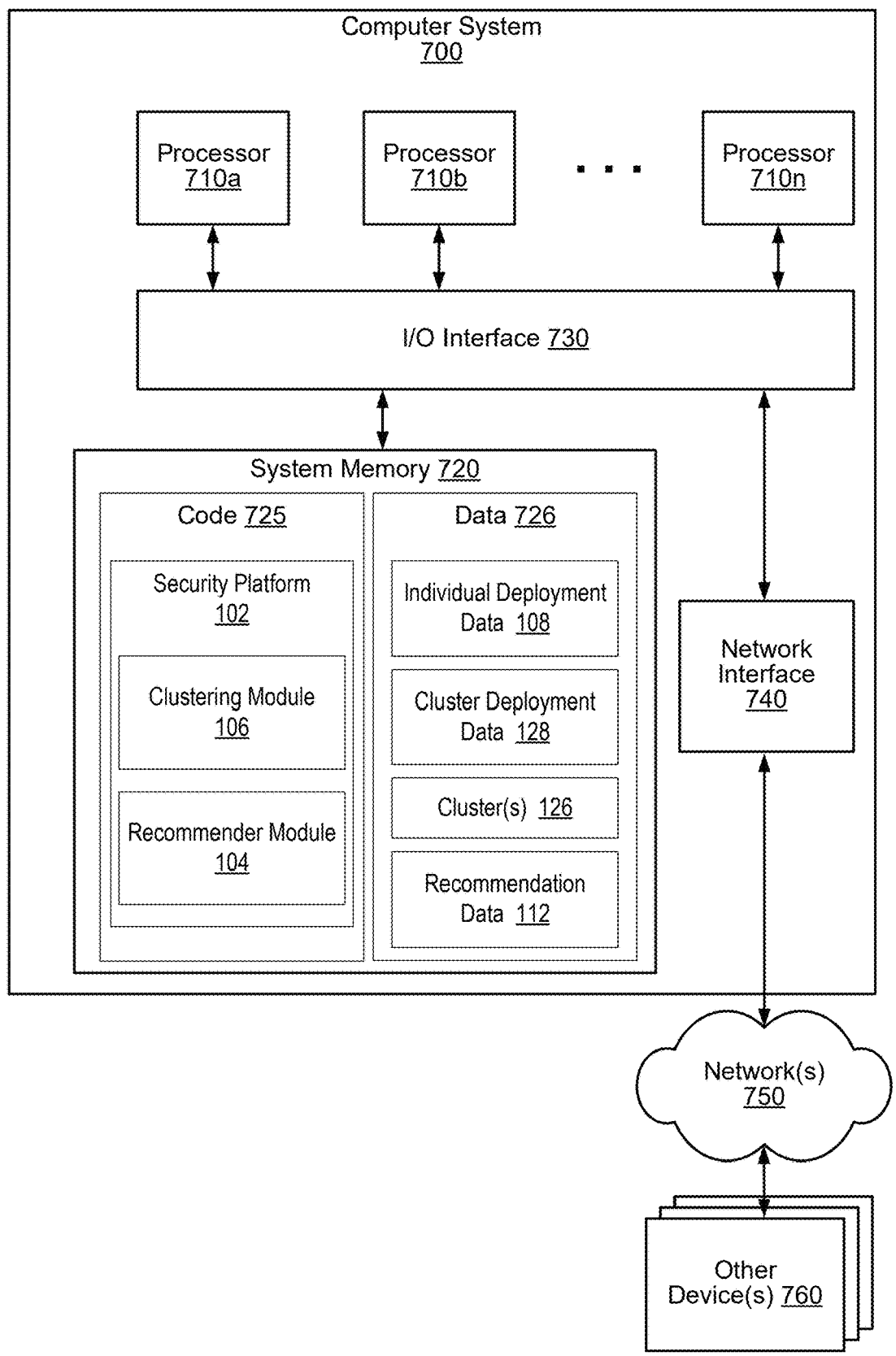
FIG. 7 is a block diagram illustrating an example computer system that may be used to implement one or more portions of a system that implements a security posture recommender system, according to some embodiments.

FIG. 7 is a block diagram illustrating an example computer system 700 that is used to implement one or more portions of a system that implements a security posture recommender system, according to some embodiments. For example, the computer system 700 may be a server that implements one or more components of the computing resource(s) 206 of FIG. 2.

Computer system 700 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 700 includes one or more processors 710, which may include multiple cores coupled to a system memory 720 via an input/output (I/O) interface 730. Computer system 700 further includes a network interface 740 coupled to I/O interface 730. In some embodiments, computer system 700 may be a uniprocessor system including one processor 710, or a multiprocessor system including several processors 710*a-n*, as shown. The processors 710 may be any suitable processors capable of executing instructions. For example, in various embodiments, processors 710 may implement one of a number of instruction set architectures (ISAs), such as the x86, PowerPC, SPARC, or MIPS ISA.

As shown, the computer system 700 may also include one or more network communication devices (e.g., network interface 740) for communicating with other systems and/or components over a communications network. For example, an instance of an application executing on computer system 700 may use network interface 740 to communicate with another server application executing on another computer system, as described herein.

As shown, computer system 700 may use its network interface 740 to communicate with one or more other devices 760, such as persistent storage devices and/or one or more I/O devices. In some embodiments, some of these other devices may be implemented locally on the computer system 700, accessible via the I/O interface 730. In various embodiments, persistent storage devices may include disk drives, tape drives, solid state memory, other mass storage devices, or any other persistent storage device. The computer system 700 may store instructions and/or data in persistent storage devices and retrieve the stored instruction and/or data as needed.

As shown, the computer system 700 may include one or more system memories 720 that store instructions and data accessible by processor(s) 710. In various embodiments, system memories 720 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 720 may be used to store code 725 or executable instructions to implement the methods and techniques described herein. For example, the executable instructions may include instructions to implement the network scanner 120 (including its associated sub-components: the network latency component 121; the dynamic RTT timeout value 122; the RTT parameters 123; and the statistics components 128), as discussed. The system memory 720 may also be used to store data 726 needed or produced by the executable instructions. For example, the in-memory data 726 may include portions of the scan results data store 130, as discussed.

In some embodiments, some of the code 725 or executable instructions may be persistently stored on the computer system 700 and may have been loaded from external storage media. The persistent storage of the computer system 700 and the external media are examples of non-transitory computer-readable storage media, which may be used to store program instructions to be executed by the computer system 700. A non-transitory computer-readable storage medium may provide the capability to store information in a form readable by a machine (e.g., computer system 700). Non-transitory computer-readable media may include storage media such as magnetic or optical media, disk or DVD/CD-ROM devices, archival tapes, network-attached storage systems, or other computer systems.

In some embodiments, the I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

In some embodiments, the network interface 740 may allow data to be exchanged between computer system 700 and other devices attached to a network. The network interface 740 may also allow communication between computer system 700 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). In some embodiments, the network interface 740 may support communication via telecommunications/telephony networks such as analog voice networks or digital fiber communications networks, via storage area networks such as Fibre Channel SANs, or via any other suitable type of network and/or protocol.

Advantages and features of the present disclosure may be further described by the following 20 statements.

1. A method comprising: determining a plurality of deployment data indicative of a plurality of deployments associated with a plurality of users, wherein a given deployment among the plurality of deployments is indicative of a given one or more assets and a given one or more security components; determining, based on the plurality of deployment data, one or more clusters of deployment data; determining, based on individual deployment data associated with an individual user among the plurality of users, that the individual user is associated with a cluster of deployment data among the one or more clusters of deployment data; and determining, based on one or more differences between the individual deployment data and the cluster deployment data, recommendation data indicative of a modification to a deployment of assets and security components associated with the individual user, wherein the modification improves a security posture of the deployment of assets and security components.

2. The method of any of the preceding statements, further comprising: determining usage data indicative of usage of one or more security components among the plurality of deployments, wherein the usage of the one or more of the security components is associated with the plurality of users; wherein the plurality of deployment data is indicative of the usage data.

3. The method of any of the preceding statements, further comprising: determining licensing data associated with the plurality of deployments, wherein the licensing data is associated with the plurality of users; wherein the plurality of deployment data is indicative of the licensing data.

4. The method of any of the preceding statements, further comprising: for a given user among the plurality of users: determining a first value indicative of a deployment comprising a first security component; determining a second value indicative of the first security component comprising a first feature; determining a third value indicative of the first feature being associated with a configuration value; and determining a fourth value indicative of a metric value associated with the first feature; wherein the plurality of deployment data is indicative of the first value, the second value, the third value, and the fourth value.

5. The method of any of the preceding statements, wherein the determining the one or more clusters of deployment data comprises: determining, based on a machine learning model, that each instance of the plurality of deployment data included within the cluster of deployment data is similar to each other instance of deployment data included within the cluster of deployment data.

6. The method of any of the preceding statements, wherein the determining the one or more clusters of deployment data comprises: determining that first deployment data is greater than a threshold level of similarity to second deployment data; wherein the threshold level of similarity is based on one or more values of the first deployment data being within a threshold difference value to one or more values of the second deployment data, and wherein the plurality of deployment data comprises the first deployment data and the second deployment data.

7. The method of any of the preceding statements, wherein determining the recommendation data comprises: determining recommendation data indicative of installing a particular security component, wherein the cluster deployment data is indicative of the particular security component, and wherein the individual deployment data is not indicative of the particular security component.

8. The method of any of the preceding statements, wherein determining the recommendation data comprises: determining recommendation data indicative of uninstalling a particular security component, wherein the cluster deployment data is not indicative of the particular security component, and wherein the individual deployment data is indicative of the particular security component.

9. A system comprising: a memory storing executable instructions; and one or more processors that execute the executable instructions to: determine a plurality of deployment data indicative of a plurality of deployments associated with a plurality of users, wherein a given deployment among the plurality of deployments is indicative of a given one or more assets and a given one or more security components; determine, based on the plurality of deployment data, one or more clusters of deployment data; determine, based on individual deployment data associated with an individual user among the plurality of users, that the individual user is associated with a cluster of deployment data among the one or more clusters of deployment data; and determine, based on one or more differences between the individual deployment data and the cluster deployment data, recommendation data indicative of a modification to a deployment of assets and security components associated with the individual user, wherein the modification improves a security posture of the deployment of assets and security components.

10. The system of any of the preceding statements, wherein the one or more processors further execute the executable instructions to: determine usage data indicative of usage of one or more security components among the plurality of deployments, wherein the usage of the one or more of the security components is associated with the plurality of users; wherein the plurality of deployment data is indicative of the usage data.

11. The system of any of the preceding statements, wherein the one or more processors further execute the executable instructions to: determine licensing data associated with the plurality of deployments, wherein the licensing data is associated with the plurality of users; wherein the plurality of deployment data is indicative of the licensing data.

12. The system of any of the preceding statements, wherein the one or more processors further execute the executable instructions to: for a given user among the plurality of users: determine a first value indicative of a deployment comprising a first security component; determine a second value indicative of the first security component comprising a first feature; determine a third value indicative of the first feature being associated with a configuration value; and determine a fourth value indicative of a metric value associated with the first feature; wherein the plurality of deployment data is indicative of the first value, the second value, the third value, and the fourth value.

13. The system of any of the preceding statements, wherein to determine the one or more clusters of deployment data, the one or more processors further execute the executable instructions to: determine, based on a machine learning model, that each instance of the plurality of deployment data included within the cluster of deployment data is similar to each other instance of deployment data included within the cluster of deployment data.

14. The system of any of the preceding statements, wherein to determine the one or more clusters of deployment data, the one or more processors further execute the executable instructions to: determine that first deployment data is greater than a threshold level of similarity to second deployment data; wherein the threshold level of similarity is based on one or more values of the first deployment data being within a threshold difference value to one or more values of the second deployment data, and wherein the plurality of deployment data comprises the first deployment data and the second deployment data.

15. The system of any of the preceding statements, wherein to determine the recommendation data, the one or more processors further execute the executable instructions to: determine recommendation data indicative of installing a particular security component, wherein the cluster deployment data is indicative of the particular security component, and wherein the individual deployment data is not indicative of the particular security component.

16. The system of any of the preceding statements, wherein to determine the recommendation data, the one or more processors further execute the executable instructions to: determine recommendation data indicative of uninstalling a particular security component, wherein the cluster deployment data is not indicative of the particular security component, and wherein the individual deployment data is indicative of the particular security component.

17. One or more non-transitory computer-accessible storage media storing executable instructions that, when executed by one or more processors, cause a computer system to: determine a plurality of deployment data indicative of a plurality of deployments associated with a plurality of users, wherein a given deployment among the plurality of deployments is indicative of a given one or more assets and a given one or more security components; determine, based on the plurality of deployment data, one or more clusters of deployment data; determine, based on individual deployment data associated with an individual user among the plurality of users, that the individual user is associated with a cluster of deployment data among the one or more clusters of deployment data; and determine, based on one or more differences between the individual deployment data and the cluster deployment data, recommendation data indicative of a modification to a deployment of assets and security components associated with the individual user, wherein the modification improves a security posture of the deployment of assets and security components.

18. The non-transitory computer-accessible storage media of any of the preceding statements, wherein the one or more processors further execute the executable instructions to: determine usage data indicative of usage of one or more security components among the plurality of deployments, wherein the usage of the one or more of the security components is associated with the plurality of users; wherein the plurality of deployment data is indicative of the usage data.

19. The non-transitory computer-accessible storage media of any of the preceding statements, wherein the one or more processors further execute the executable instructions to: determine licensing data associated with the plurality of deployments, wherein the licensing data is associated with the plurality of users; wherein the plurality of deployment data is indicative of the licensing data.

20. The non-transitory computer-accessible storage media of any of the preceding statements, wherein to determine the recommendation data, the one or more processors further execute the executable instructions to: determine recommendation data indicative of installing a particular security component, wherein the cluster deployment data is indicative of the particular security component, and wherein the individual deployment data is not indicative of the particular security component.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:
   determining a plurality of deployment data indicative of a plurality of deployments associated with a plurality of users, wherein a given deployment among the plurality of deployments is indicative of a given one or more assets and a given one or more security components;
   determining, from the plurality of deployment data, one or more clusters of deployment data, wherein each of the one or more clusters are identified based on a plurality of deployment dimensions including:
      (a) presence of an asset,
      (b) configuration data of the asset,
      (c) presence of a security component, and
      (d) licensing data for the security component;
   determining, based on individual deployment data associated with an individual user among the plurality of users, that the individual user is associated with a cluster of deployment data among the one or more clusters of deployment data; and
   determining, based on one or more differences between the individual deployment data and the cluster deployment data, recommendation data indicative of a modification to a deployment of assets and security components associated with the individual user, wherein the modification improves a security posture of the deployment of assets and security components.

2. The method of claim 1, further comprising:
   determining usage data indicative of usage of one or more security components among the plurality of deployments, wherein the usage of the one or more of the security components is associated with the plurality of users;

wherein the plurality of deployment data is indicative of the usage data.

3. The method of claim 1, wherein the plurality of deployment dimensions used to identify the one or more clusters includes one or more of:
a network configuration,
a usage pattern of the security component,
a usage pattern of the asset, and
licensing data for the asset.

4. The method of claim 1, further comprising:
for a given user among the plurality of users:
determining a first value indicative of a deployment comprising a first security component;
determining a second value indicative of the first security component comprising a first feature;
determining a third value indicative of the first feature being associated with a configuration value; and
determining a fourth value indicative of a metric value associated with the first feature;
wherein the plurality of deployment data is indicative of the first value, the second value, the third value, and the fourth value.

5. The method of claim 1, wherein the determining the one or more clusters of deployment data comprises:
determining, based on a machine learning model, that each instance of the plurality of deployment data included within the cluster of deployment data is similar to each other instance of deployment data included within the cluster of deployment data.

6. The method of claim 1, wherein the determining the one or more clusters of deployment data comprises:
determining that first deployment data is greater than a threshold level of similarity to second deployment data;
wherein the threshold level of similarity is based on one or more values of the first deployment data being within a threshold difference value to one or more values of the second deployment data, and
wherein the plurality of deployment data comprises the first deployment data and the second deployment data.

7. The method of claim 1, wherein determining the recommendation data comprises:
determining recommendation data indicative of installing a particular security component, wherein the cluster deployment data is indicative of the particular security component, and wherein the individual deployment data is not indicative of the particular security component.

8. The method of claim 1, wherein determining the recommendation data comprises:
determining recommendation data indicative of uninstalling a particular security component, wherein the cluster deployment data is not indicative of the particular security component, and wherein the individual deployment data is indicative of the particular security component.

9. A system comprising:
a memory storing executable instructions; and
one or more processors that execute the executable instructions to:
determine a plurality of deployment data indicative of a plurality of deployments associated with a plurality of users, wherein a given deployment among the plurality of deployments is indicative of a given one or more assets and a given one or more security components;
determine, from the plurality of deployment data, one or more clusters of deployment data, wherein each of the one or more clusters are identified based on a plurality of deployment dimensions including:
(a) presence of an asset,
(b) configuration data of the asset,
(c) presence of a security component, and
(d) licensing data for the security component;
determine, based on individual deployment data associated with an individual user among the plurality of users, that the individual user is associated with a cluster of deployment data among the one or more clusters of deployment data; and
determine, based on one or more differences between the individual deployment data and the cluster deployment data, recommendation data indicative of a modification to a deployment of assets and security components associated with the individual user, wherein the modification improves a security posture of the deployment of assets and security components.

10. The system of claim 9, wherein the one or more processors further execute the executable instructions to:
determine usage data indicative of usage of one or more security components among the plurality of deployments, wherein the usage of the one or more of the security components is associated with the plurality of users;
wherein the plurality of deployment data is indicative of the usage data.

11. The system of claim 9, wherein the plurality of deployment dimensions used to identify the one or more clusters includes one or more of:
a network configuration,
a usage pattern of the security component,
a usage pattern of the asset, and
licensing data for the asset.

12. The system of claim 9, wherein the one or more processors further execute the executable instructions to:
for a given user among the plurality of users:
determine a first value indicative of a deployment comprising a first security component;
determine a second value indicative of the first security component comprising a first feature;
determine a third value indicative of the first feature being associated with a configuration value; and
determine a fourth value indicative of a metric value associated with the first feature;
wherein the plurality of deployment data is indicative of the first value, the second value, the third value, and the fourth value.

13. The system of claim 9, wherein to determine the one or more clusters of deployment data, the one or more processors further execute the executable instructions to:
determine, based on a machine learning model, that each instance of the plurality of deployment data included within the cluster of deployment data is similar to each other instance of deployment data included within the cluster of deployment data.

14. The system of claim 9, wherein to determine the one or more clusters of deployment data, the one or more processors further execute the executable instructions to:
determine that first deployment data is greater than a threshold level of similarity to second deployment data;

wherein the threshold level of similarity is based on one or more values of the first deployment data being within a threshold difference value to one or more values of the second deployment data, and wherein the plurality of deployment data comprises the first deployment data and the second deployment data.

15. The system of claim 9, wherein to determine the recommendation data, the one or more processors further execute the executable instructions to:

determine recommendation data indicative of installing a particular security component, wherein the cluster deployment data is indicative of the particular security component, and wherein the individual deployment data is not indicative of the particular security component.

16. The system of claim 9, wherein to determine the recommendation data, the one or more processors further execute the executable instructions to:

determine recommendation data indicative of uninstalling a particular security component, wherein the cluster deployment data is not indicative of the particular security component, and wherein the individual deployment data is indicative of the particular security component.

17. One or more non-transitory computer-accessible storage media storing executable instructions that, when executed by one or more processors, cause a computer system to:

determine a plurality of deployment data indicative of a plurality of deployments associated with a plurality of users, wherein a given deployment among the plurality of deployments is indicative of a given one or more assets and a given one or more security components;

determine, from the plurality of deployment data, one or more clusters of deployment data, wherein each of the one or more clusters are identified based on a plurality of deployment dimensions including:
(a) presence of an asset,
(b) configuration data of the asset,
(c) presence of a security component, and
(d) licensing data for the security component;

determine, based on individual deployment data associated with an individual user among the plurality of users, that the individual user is associated with a cluster of deployment data among the one or more clusters of deployment data; and determine, based on one or more differences between the individual deployment data and the cluster deployment data, recommendation data indicative of a modification to a deployment of assets and security components associated with the individual user, wherein the modification improves a security posture of the deployment of assets and security components.

18. The non-transitory computer-accessible storage media of claim 17, wherein the one or more processors further execute the executable instructions to:

determine usage data indicative of usage of one or more security components among the plurality of deployments, wherein the usage of the one or more of the security components is associated with the plurality of users;

wherein the plurality of deployment data is indicative of the usage data.

19. The non-transitory computer-accessible storage media of claim 17, wherein the plurality of deployment dimensions used to identify the one or more clusters includes one or more of:

a network configuration,
a usage pattern of the security component,
a usage pattern of the asset, and
licensing data for the asset.

20. The non-transitory computer-accessible storage media of claim 17, wherein to determine the recommendation data, the one or more processors further execute the executable instructions to:

determine recommendation data indicative of installing a particular security component, wherein the cluster deployment data is indicative of the particular security component, and wherein the individual deployment data is not indicative of the particular security component.

* * * * *